Patented Jan. 29, 1929.

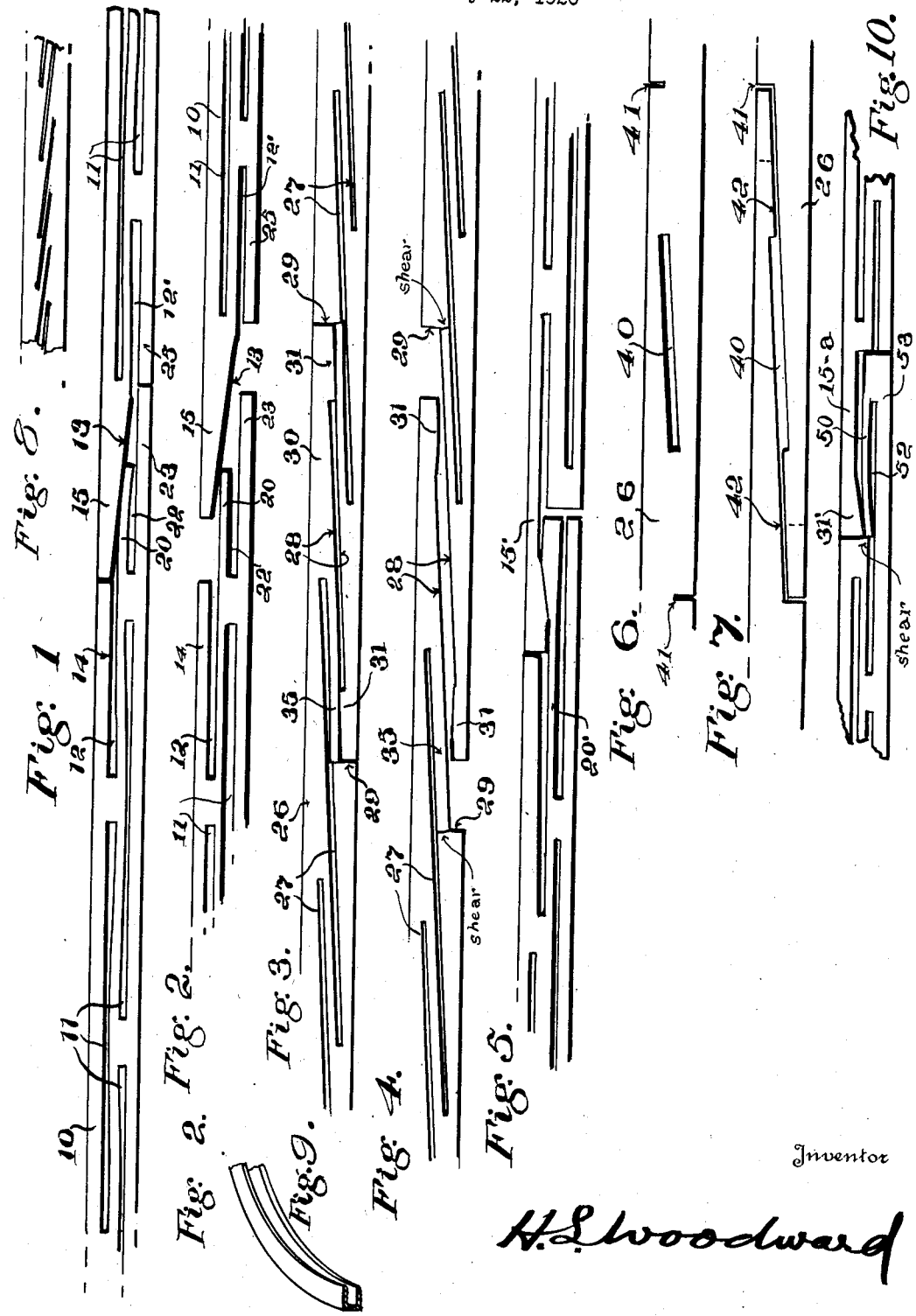

1,700,190

UNITED STATES PATENT OFFICE.

HORACE L. WOODWARD, OF ARLINGTON RIDGE, VIRGINIA, ASSIGNOR OF ONE-FOURTH TO ERNEST S. STILLMAN, ONE-FOURTH TO ARTHUR O. WOLFF, AND ONE-FOURTH TO NILS B. BLOMGREN, ALL OF BROOKLYN, NEW YORK.

PISTON RING.

Application filed July 22, 1926. Serial No. 124,257.

The invention has for an object to provide a novel joint for piston rings applicable to rings of various forms, but especially desirable in rings of the axially compressible type. It is an object to enable the embodiment of a joint which will include a snug bearing between the opposed end portions at the break, yet enabling the parts to be produced integrally in a one-piece ring. It is also applicable to rings involving more than one piece.

I take advantage of the viscosity of oil and the fact that the axially compressible type of ring is provided with radial grooves opening through its inner and outer faces which accumulate behind the ring a body of oil, together with the snug fit of such rings in the grooves to prevent leakage across the break of the ring.

It is a purpose to present a novel means for forming a contact between the opposed ends of the ring at the break. Additional objects, advantages and features of invention reside in the evolvement of a desirable construction in such devices and by the relative arrangement and manner of coaction of the parts and otherwise, as will be understood from the following description and accompanying drawings, wherein Figure 1 is a planiform projection of the outer face of a ring constructed in accordance with my invention showing the parts as when compressed between the sides of a piston groove.

Figure 2 is a view of the same construction showing the parts relieved from compression and in open relation.

Figure 3 is a view somewhat similar to Figure 1 of a modification.

Figure 4 is a view of a similar modification.

Figure 5 is a view of a further modification.

Figures 6 and 7 illustrate stages of manufacture of the construction shown in Figure 3.

Figure 8 illustrates a blank for a sheet metal ring.

Figure 9 is a perspective view of a fragment of ring formed from the blank in Figure 8.

Figure 10 shows a further modification of joint in a horizontally slotted axially compressible ring.

There is illustrated in Figures 1 and 2 a ring 10 which is provided with two series of horizontal slots 11 in respective planes parallel to the medial plane of the ring, and arranged in a staggered relation corresponding to and resembling that of ordinary courses of brick, the ends of the slots in each series being closely spaced and located intermediately of the slots in the other series.

In such rings it has been customary to provide short slots 12 opening on the ends of the ring so that the end portions of the rings will be axially compressible, it having been customary to have but one slot opening on the end of the ring heretofore. In addition, I have provided an extension of one end of the ring including a medial spring tongue 20, which may be flexed without obstructing the adjacent parts of the ring under axial compression, and on the other end I provide an inclined face 13, which when the ring is contracted to enter the cylinder while in the piston groove, will engage and bear upon the tongue 20 sufficiently to deform it slightly, as shown in Figure 1, thereby maintaining a complete seal which will continue even when the ring has worn considerably in the cylinder, or when the cylinder has become enlarged by wear allowing the ring ends to move apart somewhat from their initial adjustment. By reason of this, in addition to effecting a complete contact between the two ends of the ring, it is made unnecessary to attain extreme nicety in the manufacture and fitting of the rings in order to bring the ends into proper relation. It is sufficient to insure that the extreme ends of the ring other than the tongue mentioned and the inclined face have clearance when the ring is fitted to the piston and cylinder. Under prior practice it is necessary to attain extreme nicety in the close relation of the abutting ends, without liability of such contact when the ring is heated as to bind in the cylinder.

For convenience in illustration, a complete circular ring has not been illustrated, as the manufacture of such rings is now well understood, and they are largely used on the market, having been marketed in both forms shown in Figures 1 and 3 except for the form of joint which I illustrate, and using instead an ordinary mitre or a step-joint.

In the construction in Figures 1 and 2 a slot 12 opens on the left-hand end of the ring at the upper side corresponding to the usual slot which opens on the end of such rings as heretofore manufactured. A bar 14 is thus formed at the upper side of the ring. A lower complete slot 11 in this end of the ring has an outer end terminating adjacent but short of the end of the bar 14, and the tongue 20 springs from the solid part below the slot 12 and is formed by the provision of a short slot 22 extending into this end of the ring in line with the lower series of the slots 11. Below the tongue 20 there is formed in this manner a bar 23, similar to the one 14 first mentioned at the upper side and being somewhat longer than the tongue 20, whereby the tongue 20 is guarded against casual damage. The tongue may be thinner than the bars, as shown.

On the opposite end of the ring at the lower side a half slot 12' is formed corresponding to the one 12 at the upper side on the opposite end of the ring, providing a stud bar 25 at the lower side which may stop short of abutment with the bar 23 before mentioned. The endmost slot 11 of the upper series thereadjacent terminates at its outer end closely adjacent the extremity of the bar 25, and from this point a considerably elongated solid portion or bar 15 is formed, the upper part of which stops short immediately adjacent the extremity of the bar 14 before mentioned and the under side of which slopes gradually downward from its extremity to the mouth of the half-slot 12'.

In Figure 3 there is illustrated a construction of ring 26 in which parallel inclined slots 27 having mutually adjacent ends in overlapping relation are formed in the body portion of the ring, this construction of ring having attained some commercial use with satisfactory results. In order to form a joint for this form of ring, both ends may be identically shaped, in reverse relation. An inclined face 28 is formed on the end of the ring parallel to the next adjacent slot 27 in that end of the ring, this inclined face terminating in a shoulder 29 at its inner end, located medially of the next slot 27, and the face 28 extends a like distance outwardly beyond this slot 27, forming a tongue 30 provided with a thickened bearing or head portion 31. The material of the ring at the junction of the face 28 and the shoulder 29 over the groove 27 is severed by cutting or by a shearing movement of the shoulder part 31 and adjacent outer parts of the ring between the face 28 and slot 27 relatively to each other, so as to produce a severance which will easily remain in contact, or involve a clearance infinitely small. This forms a spring leaf 32. The ends of the ring are so trimmed that when moved longitudinally toward each other the bearing portions 31 will engage the spring tongues 32 formed by the severances last mentioned, causing the tongues to yield slightly when the ring is fitted to the piston and cylinder, whereby a complete contact and seal is formed between the ends of the rings which will be maintained when the ends are separated longitudinally by reason of wear of the ring and cylinder to a suitable extent.

Figures 6 and 7 illustrate stages of manufacture and production of the last described form of joint, although other methods may be found desirable. As shown, initially a short slot 40 inclined in a plane parallel to the next adjacent slot 27 of the finished ring is cut with a thick saw, while vertical cuts 41 may be made in the upper and lower sides of the ring spaced from the slots 40. Cuts 42 may then be formed with a thin saw connecting the bottoms of the transverse cuts with the ends of the slot 40 in such manner as to produce the raised ends 31 on the extremities thus produced, and the material of the extremities removed as indicated by the dotted lines in Figure 7, more or less, in order that the ring may be fitted as desired and described.

Figure 5 shows a construction in which a spring tongue 20' corresponding to the one first described is formed with a thickened outer end having a cam face inclined downward from the outer part toward the base of the tongue, and a bar 15' is formed on the opposite end of the ring overlying the tongue 20' and being thickened and provided with an inclined face meeting the inclined face of the tongue 20', so that by separating movement of the ring ends, greater pressure will be exerted by the bar 15' on the tongue 20'. The ring is made initially so that the tongue 20' will be flexed when initially fitted to a piston and cylinder, and as wear occurs, the closed joint will be maintained.

In Figures 8 and 9 there is illustrated a method of producing piston rings from sheet metal, the flat blank being shown in the first view, and a fragment of the ring formed shown in the second view. A flat ribbon of sheet metal is employed, in the medial zone of which slits or slots corresponding to those desired are formed, and the edge portions then bent at right angles to the medial portions on the line just without the ends of the slits or slots coincident with or followed by a longitudinal bending of the strip to give the curvature desired to form a ring. At the necessary intervals in the strip cuts suitable for the ends of the rings may be made in accordance with the earlier disclosures herein.

In Figure 10 a joint for a horizontally slotted axially compressible ring is shown in which the securing of a resilient closure of the joint is attained by elements of the ring corresponding to those shown in Figures 3 and 4. The ring is constructed with a step joint and projection 53 or arm at one side which is formed with one of the slots extending nearly to the end thereof and also inward beyond the base or beginning of the projection a substantial distance. At the other side of the joint a tongue 15ª is formed to over-lie the projection 53. A slot opens on the end of the ring in the shoulder at the base of this tongue, and the tongue may be provided with a thickened part 31′ corresponding to the one 31 before described. The metal at the upper side of the projection 53 over the slot is cut or sheared at the base of the projection 53 and the material outwardly thereof will be easily flexible. It will receive the part 31′ in bearing thereon when the parts are fitted to the piston groove.

I claim:

1. In a packing ring, a resilient ring body having a multiplicity of slots formed therein inclined to the plane of the ring and having mutually adjacent portions overlapped, the ring being broken between two slots and having a projection on at least one extremity to bear upon the opposite extremity over the slot therein.

2. The structure of claim 1 in which the material of said last named opposite extremity at the inner side of the slot thereadjacent is severed whereby to form a resilient tongue, to receive said projection of said one extremity.

3. In a packing ring, a resilient ring body having a multiplicity of slots formed therein, each extending from the inner to the outer face in a series extending throughout the length of the ring, the slots having their mutually adjacent portions overlapped to form an intervening flexible connection and make the ring axially compressible, the ring having a scarf type break whereby it may be circumferentially compressed, at least one extreme end portion adjacent the break having one of said slots extending thereinto and the material at the inner side of such slot being severed to form a resilient tongue intermediately of the side portions of the ring, the opposite end portion adjacent the break having an extremity arranged to bear on the tongue.

4. The structure of claim 3 in which the last named extremity is an extreme side portion of the ring.

5. The structure of claim 3 in which said slot extending into the end portion of the ring as stated, stops short of the extremity of the end in which it is formed.

6. The structure of claim 3 in which the said opposite end portion has an enlargement at its extremity to form contact with the tongue over a small area.

7. The structure of claim 3 in which said slot extending into the end portion of the ring as stated stops short of the extremity of the end in which it is formed, and said severance is spaced a distance from the outer end of the respective slot.

In testimony whereof I affix my signature.

HORACE L. WOODWARD.